United States Patent [19]

Chang et al.

[11] Patent Number: 4,678,763

[45] Date of Patent: Jul. 7, 1987

[54] METHOD FOR RECLAIMING HEAT-DAMAGED CATALYSTS

[75] Inventors: Clarence D. Chang, Princeton; Joseph N. Miale, Lawrenceville, both of N.J.

[73] Assignee: Mobil Oil Corporation, New York, N.Y.

[21] Appl. No.: 819,944

[22] Filed: Jan. 17, 1986

Related U.S. Application Data

[63] Continuation-in-part of Ser. No. 631,352, Jul. 16, 1984, abandoned.

[51] Int. Cl.$^4$ .................. B01J 29/38; B01J 38/66; B01J 29/28; B01J 38/48
[52] U.S. Cl. ............................ 502/26; 502/22; 502/71; 502/77; 502/85; 502/86
[58] Field of Search .................. 502/26, 22, 71, 77, 502/85, 86

[56] References Cited

U.S. PATENT DOCUMENTS

| | | | |
|---|---|---|---|
| 3,684,738 | 8/1972 | Chem | 502/26 |
| 4,326,994 | 4/1982 | Haag et al. | 252/455 |
| 4,461,845 | 7/1984 | Dessan et al. | 502/27 |
| 4,468,475 | 8/1984 | Kuehl | 502/71 |
| 4,477,582 | 10/1984 | Miale | 502/26 |
| 4,559,314 | 12/1985 | Shihabi | 502/71 |
| 4,563,435 | 1/1986 | Chu et al. | 502/71 |

FOREIGN PATENT DOCUMENTS 405569  3/1974  U.S.S.R. .................. 502/26

*Primary Examiner*—P. E. Konopka
*Attorney, Agent, or Firm*—A. J. McKillop; M. G. Gilman; L. P. Hobbes

[57] ABSTRACT

Heat-damaged ZSM-5 type catalysts are reclaimed by hydrothermal treatment with an aqueous medium followed by base exchange with an ammonium salt.

9 Claims, No Drawings

METHOD FOR RECLAIMING HEAT-DAMAGED CATALYSTS

This application is a continuation-in-part of U.S. patent application Ser. No. 631,352 filed July 16, 1984, now abandoned.

FIELD OF THE INVENTION

This invention is concerned with restoring catalytic activity to a ZSM-5 type catalyst that has been damaged by exposure to high temperatures either in the presence or in the absence of steam. In particular, the invention is concerned with a method for reclaiming such heat-damaged catalyst by treating it with a liquid water followed by ammonium exchange and calcination, and with the composition produced by the method.

BACKGROUND OF THE INVENTION

Highly active crystalline aluminosilicate catalysts of intermediate pore size have become of considerable commercial importance. One such crystalline aluminosilicate is ZSM-5, described and claimed in U.S. Pat. No. 3,702,886 to Argauer et al. This catalyst has been found useful for a number of hydrocarbon and other conversion reactions. For example, U.S. Pat. No. Re. 28,398 to Chen et al. describes its application in catalytic dewaxing; U.S. Pat. No. 4,097,367 to Haag et al. describes its use in converting olefinic hydrocarbons; U.S. Pat. No. 3,856,871 to Haag et al. describes its use for for xylene isomerization; and U.S. Pat. No. 3,928,483 to Chang et al. describes its use for the conversion of dimethyl ether to gasoline. U.S. Pat. No. 3,911,041 to Kaeding et al., U.S. Pat. Nos. 4,025,571 and '572 to Lago, U.S. Pat. No. 4,025,575 to Chang et al. and U.S. Pat. No. 4,052,479 to Chang et al. describe its use in converting methanol and/or dimethyl ether to olefins, to aromatic hydrocarbons, or to mixtures thereof. These are but a few of the large number of patents that have issued which are concerned with the applications of this versatile catalyst. The foregoing patents are incorporated herein by reference as background material.

It is known that the ZSM-5 type catalysts, in general, are more resistant to deactivation induced by the accumulation of coke than the large pore zeolites such as Zeolite X, Y, and mordenite. It is also known that ZSM-5 type catalysts deactivated by the accumulation of coke may be regenerated by burning off the coke at high temperature in an oxygen-containing gas. It is also known that ZSM-5 type catalysts are relatively resistant to permanent damage from exposure to high temperature in the presence of steam, which conditions prevail when a coked catalyst is regenerated by burning off the coke. In spite of these advantageous properties, deactivation due to coke deposition is noted after sufficient time on stream, and regeneration, with exposure to high temperature, is practiced. Such regeneration, if not carefully conducted, or if repeated a sufficient number of times, can lead to catalyst damage, i.e. a loss of catalytic activity which is not recovered by the usual regeneration. Exposure of ZSM-5 type catalyst to high temperature in the presence of product steam, such as is encountered in the conversion of methanol to gasoline, also leads to catalyst damage after a sufficient period of time. Operations involved in catalyst manufacture such as burning off the organic template, or conversion of the ammonium to the hydrogen form by calcination, if not carefully controlled, also may lead to catalyst damage. Furthermore, a number of applications, such as that described in U.S. Pat. No. 4,283,584 to Chester et al., require that the catalyst be steamed to reduce its catalytic activity to a prescribed value. Accidental oversteaming of the catalyst, i.e. steaming for too long a time or at too high a temperature, also produces a catalyst which may be regarded as damaged.

There is evidently a need for a simple and reliable method for reclaiming ZSM-5 type catalysts that have become damaged either in the course of manufacture or during use.

U.S. Pat. No. 3,493,490 to Plank et al. describes a method for reactivating damaged cracking catalysts made with large pore zeolites. In this method, the damaged catalyst is treated with an anionic reagent selected from the group consisting of liquid water at a temperature above 212° F. or a solution containing a hydroxyl ion from a non-alkalimetal compound. U.S. Pat. No. 3,533,959 to Miale et al. describes a method for reclaiming damaged large pore zeolite cracking catalysts by treatment with a chelating agent at a pH between about 7 and 9. U.S. Pat. No. 4,468,475 to Kuehl discloses a method for hydrothermally activating a high-silica crystalline zeolite composited with alumina binder. Zeolites with silica-to-alumina ratios greater than about 500:1 or, still better, over 2000:1, may be activated. None of these patents disclose or suggest the present invention.

U.S. Pat. No. 4,324,696 to Miale describes a method for preparing a superactive HZSM-5 catalyst by treatment with steam at elevated temperature followed by base exchange of the resultant steamed product with an ammonium salt. However, the method described is not applicable to a damaged catalyst, and there appears to be no suggestion to treat the catalyst with a liquid medium. These same comments apply to U.S. Pat. No. 4,374,296 to Haag et al.

The term "deactivated" is used herein in a generic sense to refer to loss of activity for any reason, such as the accumulation of coke or catalyst poisons, or possibly alteration of the crystal in some fashion. In general, deactivation due to coke and poisons is reversible by regeneration with air or hydrogen. Deactivation that is not reversed by regeneration, although not fully understood, is often ascribed to some alteration of the zeolite crystal. The term "damaged" as used herein is specifically reserved for deactivation not reversed by the usual regeneration procedures.

BRIEF SUMMARY OF THE INVENTION

We have now found that when a ZSM-5 type catalyst that has irreversibly lost a significant fraction of its acidic catalytic activity is treated under the conditions more fully described below with liquid water and when the treated catalyst is base exchanged at elevated temperature with ammonium ion followed by calcination, then the catalyst which is recovered will have a restored activity that is larger than that produced by either the hydrothermal treatment alone or by the base exchange and calcination steps in the absence of the hydrothermal treatment.

This invention is applicable for the treatment of ZSM-5 type zeolite crystals regardless whether or not the crystals are composited with a binder.

DETAILED DESCRIPTION AND PREFERRED EMBODIMENTS

The damaged catalyst that is reclaimed by the method of this invention is of the ZSM-5 type. Specifically, such damaged catalyst for the purpose of this invention comprise a crystalline zeolite having a Constraint Index of 1 to about 12 and in its as-synthesized form a silica-to-alumina ratio of about 20:1 to less than about 500:1, and preferably in the range of 20:1 to 300:1.

The ZSM-5 type zeolites are members of a novel class of zeolites that exhibit unusual properties. Although these zeolites have unusually low alumina contents, i.e. high silica to alumina ratios of at least 20, they are very active even when the silica to alumina ratio exceeds 30. The activity is surprising since catalytic activity is generally attributed to framework aluminum atoms and/or cations associated with these aluminum atoms. These zeolites, after activation, acquire an intracrystalline sorption capacity for normal hexane which is greater than that for water, i.e. they exhibit "hydrophobic" properties. It is believed that this hydrophobic character is advantageous in the present invention.

An important characteristic of the crystal structure of this class of zeolites is that it provides constrained access to and egress from the intracrystalline free space by virtue of having an effective pore size intermediate between the small pore Linde A and the large pore Linde X, i.e. the pore windows of the structure have about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels.

The ZSM-5 type zeolites referred to herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section than normal hexane is excluded and the zeolite is not of the ZSM-5 type. Windows of 10-membered rings are preferred, although in some instances excessive puckering of the rings or pore blockage may render these zeolites ineffective. 12-membered rings usually do not offer sufficient constraint to produce the advantageous conversions, although the puckered 12-ring structure of TMA offretite shows constrained access. Other 12-ring structures may exist which, due to pore blockage or to other cause, may be operative.

Rather than attempt to judge from crystal structure whether or not a zeolite possesses the necessary constrained access to molecules larger than normal paraffins, a simple determination of the "Constraint Index", or C.I., as herein defined may be made by passing continuously a mixture of an equal weight of normal hexane and 3-methylpentane over a small sample, approximately one gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature is adjusted between 550° F. and 950° F. to give an overall conversion between 10% and 60%. The mixture of hydrocarbons is passed at 1 liquid hourly space velocity (i.e. 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The C.I. is calculated as follows:

$$C.I. = \frac{\log \text{(fraction of n-hexane remaining)}}{\log \text{(fraction of 3-methylpentane remaining)}}$$

The Constraint Index approximates the ratio of the cracking rate constants for the two hydrocarbons. Zeolites suitable for the present invention are those having a Constraint Index of 1 to 12. C.I. values for some typical zeolites are:

| | C.I. (at test temperature) |
|---|---|
| ZSM-4 | 0.5 (316° C.) |
| ZSM-5 | 6–8.3 (371° C.–316° C.) |
| ZSM-11 | 5–8.7 (371° C.–316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-38 | 2 (510° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-Alumina | 0.6 (538° C.) |
| Dealuminized Y | 0.5 (510° C.) |
| Erionite | 38 (316° C.) |
| Zeolite Beta | 0.6–2.0 (316° C.–399° C.) |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby have different Constraint Indices. Constraint Index seems to vary somewhat with severity of operation (conversion) and the presence or absence of binders. Therefore, it will be appreciated that it may be possible to so select test conditions to establish more than one value in the range of 1 to 12 for the Constraint Index of a particular zeolite. Such a zeolite exhibits the constrained access as herein defined and is to be regarded as having a Constraint Index of 1 to 12. Also contemplated herein as having a Constraint Index of 1 to 12 and therefore within the scope of the novel class of highly siliceous zeolites are those zeolites which, when tested under two or more sets of conditions within the above-specified ranges of temperature and conversion, produce a value of the Constraint Index slightly less than 1, e.g. 0.9, or somewhat greater than 12, e.g. 14 or 15, with at least one other value of 1 to 12. Thus, it should be understood that the Constraint Index value as used herein is an inclusive rather than an exclusive value. That is, a zeolite when tested by any combination of conditions within the testing definition set forth hereinabove and found to have a Constraint Index of 1 to 12 is intended to be included in the instant catalyst definition regardless that the same identical zeolite tested under other defined conditions may give a Constraint Index value outside of 1 to 12.

The class of zeolites defined herein is exemplified by ZSM-5, ZSM-11, ZSM-12, ZSM-21, ZSM-23, ZSM-35, ZSM-38, ZSM 48, and other similar materials. U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-21 is more particularly described in U.S. Pat. No. 4,046,859, the entire content of which is incorporated herein by reference.

ZSM-23 is more particularly described in U.S. Pat. No. 4,076,842, the entire content of which is incorporated herein by reference.

ZSM-35 is more particularly described in U.S. Pat. No. 4,016,245, the entire content of which is incorporated herein by reference.

ZSM-38 is more particularly described in U.S. Pat. No. 4,046,859, the entire content of which is incorporated herein by reference.

The specific zeolites described, when prepared in the presence of organic cations, are substantially catalytically inactive, possibly because the intra-crystalline free space is occupied by organic cations from the forming solution. They may be activated by heating in an inert atmosphere at 1000° F. for one hour, for example, followed by base exchange with ammonium salts followed by calcination at 1000° F. in air.

The ZSM-5 type zeolites referred to herein have a crystal framework density, in the dry hydrogen form, of not less than about 1.6 grams per cubic centimeter. The dry density for known crystal structures may be calculated from the number of silicon plus aluminum atoms per 1000 cubic Angstroms, as given, e.g., on Page 19 of the article on Zeolite Structure by W. M. Meier. This paper, the entire contents of which are incorporated herein by reference, is included in "Proceedings of the Conference on Molecular Sieves, London, April 1967," published by the Society of Chemical Industry, London, 1968. When the crystal structure is unknown, the crystal framework density may be determined by classical pycnometer techniques. For example, it may be determined by immersing the dry hydrogen form of the zeolite in an organic solvent not sorbed by the crystal. Or, the crystal density may be determined by mercury porosimetry, since mercury will fill the interstices between the crystals but will not penetrate the intracrystalline free space.

Crystal framework densities of some typical zeolites which may be restored by the method of this invention, including some which are not within the purview of this invention, are:

| Zeolite | Void Volume | Framework Density |
| --- | --- | --- |
| Ferrierite | 0.28 cc/cc | 1.76 g/cc |
| Mordenite | .28 | 1.7 |
| ZSM-5, 11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4, Omega | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

The damaged ZSM-5 zeolites that are treated by the method of this invention may be incorporated in another material usually referred to as a matrix or binder. Such matrix materials include synthetic or naturally occuring substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina and silica-magnesia. The matrix may be in the form of a cogel. The relative proportions of zeolite component and inorganic oxide gel matrix on an anhydrous basis may vary widely with the zeolite content ranging from between about 5 to about 99 percent by weight and more usually in the range of about 10 to about 80 percent by weight of the dry composite.

The term "acid catalytic activity" as used herein refers to the effectiveness of the zeolite, when in suitable form, for catalyzing reactions known to be promoted by so-called acid catalysts. Catalytic cracking, hydrocracking, skelatal isomerization, catalytic dewaxing, and various aromatic hydrocarbon reactions such as alkylation, dealkylation, isomerization and disproportionation, are hydrocarbon conversion reactions which fall in the category of acid catalyzed reactions. Other reactions, such as alcohol dehydration, are also in this class.

As is known in the art, the acid catalytic activity of a zeolite may be measured by its "alpha value", which is the ratio of the rate constant of a test sample for cracking normal hexane to the rate constant of a standard reference catalyst. Thus, an alpha value=1 means that the test sample and the reference standard have about the same activity. The alpha test is described in U.S. Pat. No. 3,354,078 and in the publication by D. H. Olson, W. O. Haag and R. M. Lago in *The Journal of*

*Catalysis,* Vol. VI, at pp. 394-395 (1966), both of which are incorporated herein by reference. Measurement of the "alpha value" is generally useful to assess the extent of catalyst damage before treatment, and also the degree of restoration achieved with any sample treated by the method of this invention. In measuring alpha values for the purpose of this invention, it is preferred that the determinations of hexane cracking activity be made at a fixed temperature, e.g. 538° C., as described in the above cited paper by D. H. Olson et al. Also, it is to be understood that any alpha values referred to in this specification and in the examples refers to the values as obtained on the hydrogen form of the zeolite.

It is also contemplated for purposes of this invention to use reactions other than hexane cracking for evaluating restoration of catalytic activity. Such reactions include catalytic dewaxing and the conversion of methanol to olefins (MTO). A damaged catalyst may be deemed restored by the method of this invention if such method, for any organic compound conversion, shows a restored catalytic activity that is larger than that produced by either the hydrothermal treatment alone or by the base exchange and calcination steps in the absence of hydrothermal treatment, regardless whether or not the hexane cracking reaction confirms such determination.

The method of this invention is applicable to restore acid activity to a heat-damaged ZSM-5 type catalyst whether that damage is incurred during manufacture, or during use of the zeolite catalyst in a conversion reaction such as one of those above enumerated. It is applicable whether or not the catalyst composition includes a binder such as alumina or silica-alumina. It is also applicable to catalysts which have suffered a relatively small amount of damage, such as a loss of about 10% of its catalytic activity, or it may be more severely damaged, as evidenced by a substantially larger loss such as 50% or more of its catalytic activity. No special preparation of the damaged catalyst is contemplated prior to restoration by the method of this invention unless organic residues are present such as coke, in which case it is desirable to remove the same prior to proceeding.

The restoration procedure of this invention is very simple. The damaged catalyst is contacted with liquid water at a temperature of 15° C. to 370° C. for about 1 to 100 hours. The amount of liquid is not precisely critical, but enough must be supplied to at least fill the pores of the catalyst. As a practical matter, restoration proceeds best when the catalyst is immersed in the liquid water. The precise time and temperature required for an effective restoration will depend to some extent on the damaged zeolite. In any case, it is contemplated to employ a time and temperature which is effective to provide an increase in hexane cracking activity of at least 5 alpha units measured on a sample of the treated material which has been converted to the ammonium form by ion exchange at an elevated temperature of about 80° C. and calcined to produce the hydrogen form, compared with a similarly exchanged converted sample of the damaged catalyst in the absence of said treatment with liquid water.

The temperature of treatment with liquid water is about 80° C. to 370° C., with a preferred temperature of 150° C. to 200° C. Liquid water does not exist above its critical temperature of 374° C.

In practicing the present invention, it is very important to provide treatment conditions that avoid loss of liquid water at temperatures above the boiling point. For treatment at the boiling point, reflux is adequate. Above about 100° C., treatment is effected preferably in a closed vessel under autogenous pressure to avoid loss of liquid water.

After treatment with the liquid aqueous medium, the catalyst is converted to the ammonium form by base exchange with an ammonium salt at elevated temperature of about 50° C. to about 100° C., preferably at about 80° C. The restored catalyst may be calcined to convert it to the hydrogen form prior to use.

This invention will now be illustrated by examples.

EXAMPLES

In Examples 1-15, the product formed in each example was tested for hexane cracking activity. For easy comparison, the alpha values obtained all are reported in Table I.

Example 1

A sample of ZSM-5 ($SiO_2/Al_2O_3 = 70$, alpha=about 200) was heated in air in a muffle furnace to 800° C. and calcined for one hour at 800° C. Its hexane cracking activity (alpha) was measured (alpha=80). A 22-gram aliquot of this product was heated to 1000° C. in air and calcined for one hour at 1000° C. An aliquot was tested for hexane cracking activity.

Example 2

A 0.5 gram aliquot of the product of Example 1 was exchanged overnight by contacting with 40 ml 1N $NH_4NO_3$ at ambient temperature. It was washed and reexchanged with 40 ml 1N $NH_4NO_3$ at 80° C. for two hours. It was then washed and dried at 130° C. for one hour. The catalyst was air calcined at 538° C. for 30 minutes prior to checking its hexane cracking activity.

Example 3

A 1 gram aliquot of the product of Example 1 was subjected to mild steaming (100% steam at 450° C.) for 20 hours. It was then calcined in air for 30 minutes at 538° C. and tested for hexane cracking activity.

Example 4

A 0.5 gram aliquot of the product of Example 3 was exchanged as in Example 2 (40 ml 1N $NH_4NO_3$ at 80° C. followed by washing, drying, and 30 minute calcination at 538° C.).

Example 5

A 1 gram aliquot of the product of Example 1 was placed in a 15 ml test tube and covered with about 5 ml water. A glass wool plug was inserted to prevent losses by possible "bumping". The test tube was put into a 300 ml autoclave containing adequate water to satisfy autogenous pressure requirements. The autoclave was heated to 154° C. (p=75 psig) to remain for 60 hours. The autoclave was cooled and the test tube contents dried and tested for hexane cracking activity.

Example 6

A 0.5 gram aliquot of the product of Example 5 was exchanged with 40 ml 1N $NH_4NO_3$ (as in Example 2) washed, dried and tested for hexane cracking activity.

Example 7

A 2.58 gram aliquot of the product of Example 1 was heated to 482° C. in nitrogen at 1000 psig. Dimethyl ether was pumped over the catalyst for five hours at 6 ml liquid DME per hour. This conversion yielded water as a product which served to hydrothermally treat the catalyst. The conversion was repeated at atmospheric pressure for 4.25 hours at 482° C. and 4 hours at 371° C. The used catalyst was tested for hexane cracking activity.

Example 8

The product of Example 7 was regenerated in air for five hours at 538° C. in a muffle furnace to remove carbonaceous materials. It was exchanged with 80 ml 1N NH$_4$NO$_3$ for one hour, washed and reexchanged with fresh 1N NH$_4$NO$_3$ overnight. The catalyst was washed, reexchanged with 1N NH$_4$NO$_3$ at 80° C., washed and dried for one hour at 130° C. An aliquot was tested for hexane cracking activity.

Example 9

A 20 gram sample of HZSM-5 was steamed for 20 hours at 566° C. (100% flowing steam). An aliquot was tested for hexane cracking activity.

Example 10

A 0.4 gram aliquot of the product of Example 9 was exchanged with 40 ml 1N NH$_4$NO$_3$ at 80° C. for two hours. The sample was washed, dried for one hour at 130° C., then tested for hexane cracking activity.

Example 11

A 1 gram aliquot of the product of Example 9 was placed in a 15 ml test tube covered with water and hydrothermally treated simultaneously with Example 5.

Example 12

A 0.5 gram aliquot of the product of Example 11 was treated exactly as Example 6.

Example 13

An 11.7 gram sample of HZSM-5 extrudate, 65% zeolite/35% alumina, (alpha of zeolite about 200) was calcined 20 minutes at 538° C. and steamed for 24 hours at 566° C. (flowing undiluted steam). An aliquot was tested for hexane cracking activity.

Example 14

A 1 gram aliquot of the product of Example 13 was exchanged with 40 ml 1N NH$_4$NO$_3$ overnight. It was washed, dried at 130° C., calcined 30 minutes at 538° C. The catalyst was reexchanged with fresh NH$_4$NO$_3$, dried at 130° C., calcined for one hour at 538° C. and tested for hexane cracking activity.

Example 15

A 0.7 gram aliquot of the product of Example 14 was placed in a 15 ml test tube, covered with about 5 ml water. It was treated exactly as and simultaneously with Examples 5 and 11. An aliquot was tested for hexane cracking activity.

Example 16

A 0.35 gram aliquot of the product from Example 15 was exchanged with 40 ml of 1N NH$_4$NO$_3$ for 16 hours. It was filtered, washed and reexchanged with 1N NH$_4$NO$_3$ for two hours at 80° C. and tested for hexane cracking activity.

The alpha values obtained in Examples 1–16 are summarized in Table I.

TABLE I

| Example | Catalyst Treatments | Alpha Values |
|---|---|---|
| 1 | Thermal deactivation | 0.4 |
| 2 | Ex 1 + NH$_4$$^+$ exchange | 1 (severe aging) |
| 3 | Ex 1 + mild steam | 0.5 |
| 4 | Ex 3 + NH$_4$$^+$ exchange | 1.1 |
| 5 | Ex 1 + hydrothermal treatment | 1.7 |
| 6 | Ex 5 + NH$_4$$^+$ exchange | 6.6 |
| 7 | Ex 1 + In situ hydrothermal | 1.3 |
| 8 | Ex 7 + NH$_4$$^+$ exchange | 1.9 |
| 9 | Steam deactivation | 6.3 |
| 10 | Ex 9 + NH$_4$$^+$ exchange | 104 |
| 11 | Ex 9 + hydrothermal treatment | 7.6 |
| 12 | Ex 11 + NH$_4$$^+$ exchange | 120 |
| 13 | Steam deactivation (extrudate) | 14 |
| 14 | Ex 13 + NH$_4$ exchange | 33 |
| 15 | Ex 13 + hydrothermal treatment | 30 |
| 16 | Ex 15 + NH$_4$$^+$ exchange | 56 |

Above Examples 5, 7, 11 and 15 show activation by hydrothermal treatment. Examples 6, 8, 12 and 16 show the additional improvement when hydrothermal treatment is followed by ammonium salt exchange.

What is claimed is:

1. A method for reclaiming an unbound catalyst that because of heat damage has lost at least 10% of its activity for cracking normal hexane, said catalyst comprising a zeolite having a Constraint Index of 1 to about 12 and a silica-to-alumina ratio of about 20:1 to less than about 500:1, said damaged catalyst being further characterized by a measurable increase in hexane cracking activity when base exchanged at about 80° C. with an ammonium salt followed by conversion to the hydrogen form, said method consisting essentially of:

contacting said heat-damaged catalyst with liquid water at a temperature of about 80° C. to about 370° C. for about 1 to 100 hours, said combination of temperature and time being effective to augment said measurable increase in hexane cracking activity by at least about 5 alpha units; and, converting said contacted catalyst to the ammonium form by ion exchange with an ammonium salt at a temperature of about 50° C. to about 100° C.

2. The method described in claim 1 wherein said contacting is at a temperature of about 150° C. to 200° C.

3. The method described in claim 1 wherein said contacting is at a temperature of about 80° C. to 150° C.

4. The method described in claim 3 wherein said contacting is conducted by refluxing said liquid water at its boiling point at atmospheric pressure.

5. The method described in claim 1 wherein said zeolite is ZSM-5.

6. The method described in claim 2 wherein said zeolite is ZSM-5.

7. The method described in claim 3 wherein said zeolite is ZSM-5.

8. The method described in claim 4 wherein said zeolite is ZSM-5.

9. A method for reclaiming an unbound catalyst that because of heat damage has lost catalytic activity for converting an organic compound, said catalyst comprising a zeolite having a Constraint Index of 1 to about 12 and a silica-to-alumina ratio of about 20:1 to less than about 500:1, which method consists essentially of:

contacting said heat-damaged catalyst with liquid water at a temperature of about 80° C. to about 370° C. for about 1 to 100 hours, said combination of temperature and time being effective to augment said catalytic activity; and converting said contacted catalyst to the ammonium form by ion exchange with an ammonium salt at a temperature of about 50° C. to about 100° C. and calcining said ammonium zeolite; and, recovering a catalyst with greater activity for converting said organic compound than is obtained by said contacting step alone or by said conversion to the ammonium form in the absence of said contacting step.

* * * * *